(12) United States Patent
Zhu

(10) Patent No.: US 10,645,979 B2
(45) Date of Patent: May 12, 2020

(54) GARMENT WITH A BUILT-IN BRA AND HAVING A STRETCHABLE FABRIC LAYER EXTENDING ALONG A BACK FABRIC PORTION THEREOF

(71) Applicant: B.L.TOPS LLC, West Orange, NJ (US)

(72) Inventor: Muran Zhu, Washington, DC (US)

(73) Assignee: B.L.TOPS LLC, West Orange, NJ (US)

( * ) Notice: Subject to any disclaimer, the term of this patent is extended or adjusted under 35 U.S.C. 154(b) by 112 days.

(21) Appl. No.: 15/915,075

(22) Filed: Mar. 8, 2018

(65) Prior Publication Data

US 2019/0274370 A1   Sep. 12, 2019

(51) Int. Cl.
*A41C 3/08* (2006.01)
*A41B 1/08* (2006.01)
*B32B 5/26* (2006.01)

(52) U.S. Cl.
CPC ............... *A41C 3/08* (2013.01); *A41B 1/08* (2013.01); *B32B 5/26* (2013.01); *A41B 2400/38* (2013.01); *B32B 2437/00* (2013.01)

(58) Field of Classification Search
CPC ....... A41C 3/00; A41C 3/0014; A41C 3/0021; A41C 3/0057; A41C 3/08; A41C 3/10
USPC ................................................ 450/30–31, 36
See application file for complete search history.

(56) References Cited

U.S. PATENT DOCUMENTS

| | | | |
|---|---|---|---|
| 4,564,015 A | 1/1986 | Friedman | |
| 4,798,557 A | 1/1989 | Scott | |
| 4,956,878 A * | 9/1990 | Boynton | A41D 7/00 2/67 |
| 6,162,111 A * | 12/2000 | Heroff | A41C 3/08 2/69 |
| 6,443,805 B1 * | 9/2002 | Kirkwood | A41C 3/0035 450/31 |
| 6,530,820 B1 * | 3/2003 | Katze | A41C 3/08 450/30 |
| 6,846,217 B1 | 1/2005 | Struble et al. | |
| 7,628,675 B2 | 12/2009 | Staub | |
| 2002/0031978 A1 * | 3/2002 | Heroff | A41C 3/08 450/30 |

(Continued)

*Primary Examiner* — Gloria M Hale
(74) *Attorney, Agent, or Firm* — John H. Choi & Associates

(57) ABSTRACT

Disclosed is a garment with built-in bra. The garment includes a first fabric layer, which includes a front fabric portion having an outer surface and an inner surface and a back fabric portion having an outer surface and an inner surface. The garment also includes a pair of bra cups having first peripheral portions, second peripheral portions, and third peripheral portions. The garment further includes a pair of side panels connected to the pair of bra cups at the first peripheral portions. The garment further includes a second fabric layer having a front fabric portion and a back fabric portion. The front fabric portion of the second fabric layer is connected to the pair of bra cups at one or more of the second peripheral portions and the third peripheral portions. The garment further includes one or more flexible bands extending between and sewn to the second fabric layer and the inner surface of the back fabric portion of the first fabric layer. The garment further includes a flexible band extending along or proximally to a bottom edge of the second fabric layer.

12 Claims, 4 Drawing Sheets

(56) References Cited

U.S. PATENT DOCUMENTS

| | | | | |
|---|---|---|---|---|
| 2004/0166766 | A1* | 8/2004 | Schneider | A41D 1/215 450/36 |
| 2006/0223414 | A1 | 10/2006 | Staub | |
| 2008/0022434 | A1* | 1/2008 | Adelman | A41D 1/215 2/104 |
| 2008/0026676 | A1* | 1/2008 | Rothman | A41C 3/08 450/36 |
| 2009/0265830 | A1* | 10/2009 | Hendrickson | A41D 1/215 2/104 |
| 2009/0265831 | A1* | 10/2009 | Hendrickson | A41C 3/04 2/104 |
| 2011/0092133 | A1* | 4/2011 | Livingstone | A41C 3/08 450/31 |
| 2011/0281497 | A1* | 11/2011 | Van Dorp | A41C 3/148 450/31 |
| 2011/0314587 | A1* | 12/2011 | Ritchie | A41C 3/04 2/104 |
| 2012/0190271 | A1* | 7/2012 | Livingstone | A41C 3/08 450/31 |
| 2014/0099864 | A1* | 4/2014 | Moulden | A41C 3/08 450/31 |
| 2015/0143605 | A1* | 5/2015 | Cobb | A41C 3/04 2/104 |
| 2017/0208873 | A1* | 7/2017 | Farneti | A41D 13/0017 |

\* cited by examiner

GARMENT WITH A BUILT-IN BRA AND HAVING A STRETCHABLE FABRIC LAYER EXTENDING ALONG A BACK FABRIC PORTION THEREOF

TECHNICAL FIELD

The present disclosure relates generally to garments and, more particularly to, a garment with built-in bra having a pair of bra cups being supported by means of a stretchable fabric layer extending along an inner surface of a back fabric portion thereof.

BACKGROUND

Certain top garments, such as camisoles, spaghetti tops, etc., are worn by women both as a formal and an informal article of clothing. Usually, these top garments do not provide any support for wearer's breasts. As a result, women have to wear additional undergarments, such as a bra, underneath these top garments. However, wearing a conventional bra underneath a camisole with thin straps often results in the undesirable reveal of bra straps around shoulders or back. Some strapless bras are known, which may be worn to preclude such undesirable reveal of bra straps, but with the strapless bras there is always a risk of the bra slipping down or the breasts being pushed flat, which is often undesirable for the wearers. Bras that are applied with adhesives are also available in the market, but these are usually expensive and can be uncomfortable to wear for a long period of time. Furthermore, camisoles with built-in bra, such as sports bra tanks, are available in the market, but these camisoles are usually made of highly elastic fabrics in order to expand or retract to conform to the breast of the wearer, leaving the camisole to be unflattering and undesirable outside of the sports context. Therefore, it is an object of this invention to obviate the aforesaid problems and to provide wearers with a garment that has both a body-hugging, supportive built-in bra structure on the inside and a loose-fitting look from the outside.

Applicant believes that a related reference may correspond to U.S. Pat. No. 4,564,015 A (hereinafter referred to as '015 patent). The '015 patent discloses ladies' top garment with a sewn-in support element to replace the conventional brassiere. In order to provide sufficient support for women wearing lightweight garments, such as a tank top, the '015 patent provides a separate garment component attached to the upper inner side of the main top, extending rearwardly past its side seam and ending in a releasably engageable strap element at the back. The ladies' top garment of the '015 patent may not be convenient to put on as it may require engaging the clasp element at the back each time. Further, due to the use of the clasp, the garment may be uncomfortable to wear as the hardware may pinch the wearer.

Another related reference corresponds to U.S. Pat. No. 6,336,840 B2 (hereinafter referred to as '840 patent), which is directed to women's clothing apparel including a built-in bra. The '840 patent discloses that the straps of the bra are fastened to the shoulder supports of a top garment substantially along the length of the shoulder supports from the front to the back of the garment. Similar to the ladies' top garment of the '015 patent, the women's clothing apparel of the '840 patent may not be convenient to put on as it may require engaging the clasps and adjustment arrangements at the back each time. Further, due to the use of such clasps and adjustment arrangements, the said clothing apparel may be uncomfortable to wear as the hardware may pinch the wearer.

Another related reference corresponds to U.S. Pat. No. 6,846,217 B1 (hereinafter referred to as '217 patent). The '217 patent discloses a women's garment with built-in breast support and no underwire. The disclosed women's garment includes an exterior fabric layer for covering the torso and having an upper part for at least partly covering the breasts. An interior fabric layer is connected to the upper part of the exterior fabric layer and is sized to extend only over the upper part of the exterior fabric layer on the inner surface thereof to cover at least part of the breasts of a woman. A pair of side support panels are connected to the interior fabric layer, each at over one lateral area of the torso, the lateral areas being adjacent respective lateral sides of the breasts and are made of non-stretch material for supporting the breasts. A pair of tapes or other fixing mechanisms are connected to the interior fabric layer and extend along respecting medial edges of the side support panels. The '217 patent provides an interior bra structure with non-stretching side panels for supporting the breasts using tapes or other fixing mechanisms. Such fixing mechanisms may not be able to provide firm or reliable support to the breasts of the wearer. Furthermore, the '217 patent does not allow the garment to appear loose-fitting on the outside while maintaining a body-hugging, supportive interior bra structure.

From the above discussion, it may be understood that there are a few shortcomings of existing garments. Therefore, there exists a need to overcome the aforementioned limitations and develop a garment with built-in bra which can reliably support the breasts of the wearer without compromising the flattering look of regular loose-fitting garments or being uncomfortable to wear over longer durations.

SUMMARY

Various embodiments of the present disclosure provide garments.

In one aspect, a garment with built-in bra is disclosed. The garment includes a first fabric layer including a front fabric portion for at least partially covering a chest of a wearer, the front fabric portion having an outer surface and an inner surface opposite to the outer surface thereof; and a back fabric portion for at least partially covering a back of the wearer, the back fabric portion having an outer surface and an inner surface opposite to the outer surface thereof. The garment further includes a pair of bra cups disposed on the inner surface of the front fabric portion. Each bra cup of the pair of bra cups has a first peripheral portion, a second peripheral portion and a third peripheral portion. The garment further includes a pair of side panels sewn to the inner surface of the front fabric portion and connected to each bra cup of the pair of bra cups at respective first peripheral portions. The garment further includes a second fabric layer, which includes a front fabric portion and a back fabric portion. The back fabric portion of the second fabric layer extends along the back fabric portion of the first fabric layer. The back fabric portion of the second fabric layer has a first end and a second end. The front fabric portion of the second fabric layer extends from the respective two ends of the back fabric portion of the second fabric layer and is connected to the pair of bra cups at one or more of the second peripheral portions and the third peripheral portions. The garment further includes one or more flexible bands extending between and sewn to the back fabric portion of the second fabric layer and the inner surface of the back fabric portion of the first fabric layer, to connect the first fabric layer and the second fabric layer therein.

Other aspects and example embodiments are provided in the drawings and the detailed description that follows.

BRIEF DESCRIPTION OF THE FIGURES

For a more complete understanding of example embodiments of the present technology, reference is now made to the following descriptions taken in connection with the accompanying drawings in which.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details.

Reference in this specification to "one embodiment" or "an embodiment" means that a particular feature, structure, or characteristic described in connection with the embodiment is included in at least one embodiment of the present disclosure. The appearance of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

Figure 1:
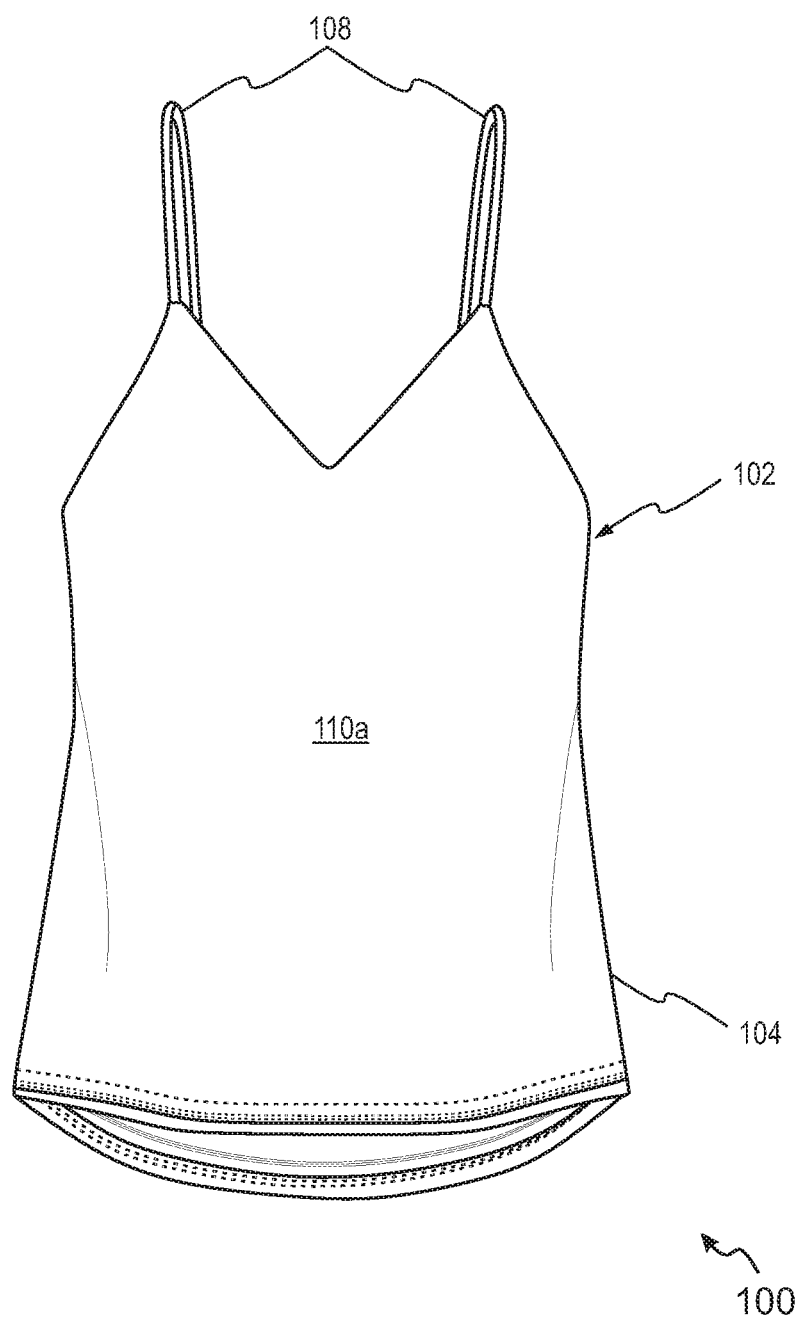
FIG. 1 is a front view of a garment with built-in bra, according to an embodiment of the present disclosure.

Referring to the drawings, FIG. 1 illustrates a garment with built-in bra (generally referred by the numeral 100), according to one embodiment of the present disclosure. Hereinafter, the term "garment with built-in bra 100" has been interchangeably referred to as "garment 100" without any limitations. It should be noted that the garment 100 is embodied as a camisole in the present disclosure; however, alternatively, the garment 100 may be embodied as a blouse, dress, top, and slip, or any other article of clothing known in the art, and more specifically any garment used for covering at least parts of torso of a female wearer without affecting the scope of the present disclosure.

As shown in the FIG. 1, the garment 100 includes a first fabric layer 102. The first fabric layer 102 of the garment 100 may be made of a non-elastic or slightly elastic material, such as silk. In other embodiments of the present disclosure, the first fabric layer 102 may have multiple layers, for example, two layers or three layers of identical shape and size joined together to form the first fabric layer 102. In such an embodiment, each of the multiple layers of the first fabric layer 102 may be made of the same non-elastic material or with a material having the same or substantially the same elastic properties.

Figure 2:
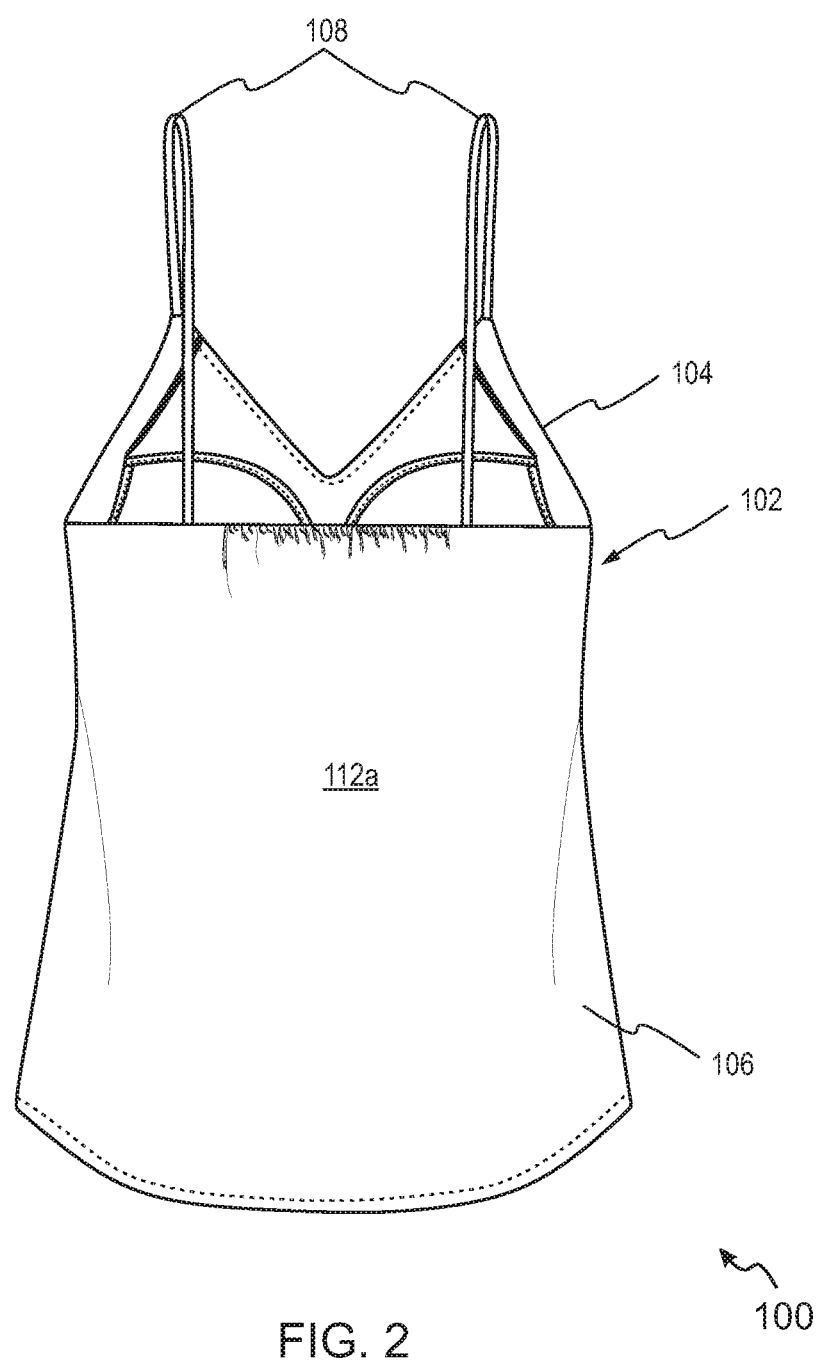
FIG. 2 is a rear view of the garment with built-in bra of FIG. 1, according to an embodiment of the present disclosure.

Referring to FIGS. 1 and 2 in combination, the first fabric layer 102 includes a front fabric portion 104 and a back fabric portion 106. The front fabric portion 104 of the first fabric layer 102 is adapted to at least partially cover a chest of a wearer (not shown in the drawings). In other words, when the garment 100 is worn by the wearer, the front fabric portion 104 covers at least front portion of upper human body between neck and waistline. The front fabric portion 104 also defines a neckline of the garment 100, and, in the illustrated example, includes a substantially inverted triangular cut (not numbered) in top peripheral surface of the front fabric portion 104. As would be evident to those skilled in the art that the neckline of the garment 100 defined by the front fabric portion 104 may be of various other shapes and designs without any limitations.

As may be seen in FIGS. 1 and 2, the front fabric portion 104 is connected to the back fabric portion 106. In some examples, the front fabric portion 104 and the back fabric portion 106 may be a continuous fabric structure. In an embodiment, the front fabric portion 104 may be woven to the back fabric portion 106. In alternative embodiments of the present disclosure, the front fabric portion 104 is connected to the back fabric portion 106 by means of netting or with any other means known in the art. The front fabric portion 104 and the back fabric portion 106 may be available in a variety of fabrics, styles and colors. The front fabric portion 104 and the back fabric portion 106 collectively form an outer shell of the garment 100. Being made of non-elastic or slightly elastic material, the front fabric portion 104 and the back fabric portion 106 can be, for example, nylon, wool, rayon, silk, cotton, or any other fabric with substantially inelastic knit.

Further, the garment 100 may include a pair of shoulder straps 108 adapted to hold the garment 100 on the shoulders of a wearer. As illustrated in FIGS. 1, 2, 3, and 4, the pair of shoulder straps 108 may extend between the front fabric portion 104 and the back fabric portion 106. In the present embodiment, the pair of shoulder straps 108 extends between and is connected to the front fabric portion 104 and the back fabric portion 106, forming a loop around each shoulder of the wearer when the garment 100 is worn. It may be contemplated that the pair of shoulder straps 108 may be connected to the front fabric portion 104 and the back fabric portion 106 such that openings for receiving arms and head are defined in the top peripheral surfaces of each of the front fabric portion 104 and the back fabric portion 106. In the present embodiment, wherein the pair of shoulder straps 108 forms a loop around each shoulder of the wearer, the pair of shoulder straps 108 holds the garment 100, and weight thereon, on the shoulders of the wearer. In alternative embodiments, the pair of shoulder straps 108 may be connected to at least the front fabric portion 104. For example, the pair of shoulder straps 108 may be connected to the front fabric portion 104 and be tied around a neck of the wearer when worn in order to provide support to the garment 100.

In various other embodiments of the present disclosure, the pair of shoulder straps 108 may have, for example, cross, parallel, tie up around the neck, or any other configuration in back or front. The pair of shoulder straps 108 may be made from any suitable non-elastic or elastic material, including the material implemented for the front fabric portion 104 and the back fabric portion 106. Further, the pair of shoulder straps 108 may have any shape, width, thickness, or color. In various embodiments of the present disclosure, the pair of shoulder straps 108 may have an adjustable configuration, in back or front.

Figure 3:
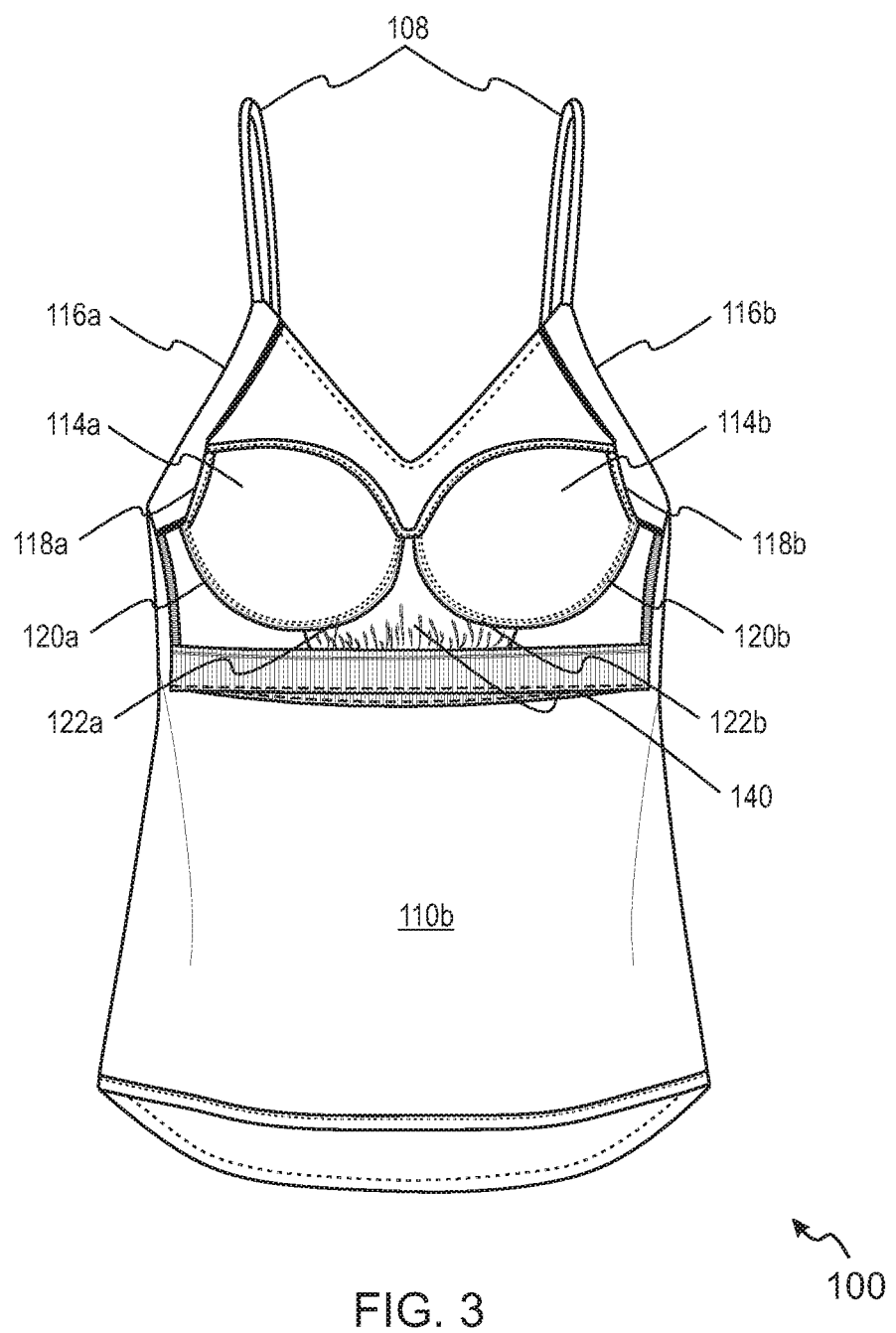
FIG. 3 is an interior front view of the garment with built-in bra of FIG. 1, according to an embodiment of the present disclosure.
Figure 4:
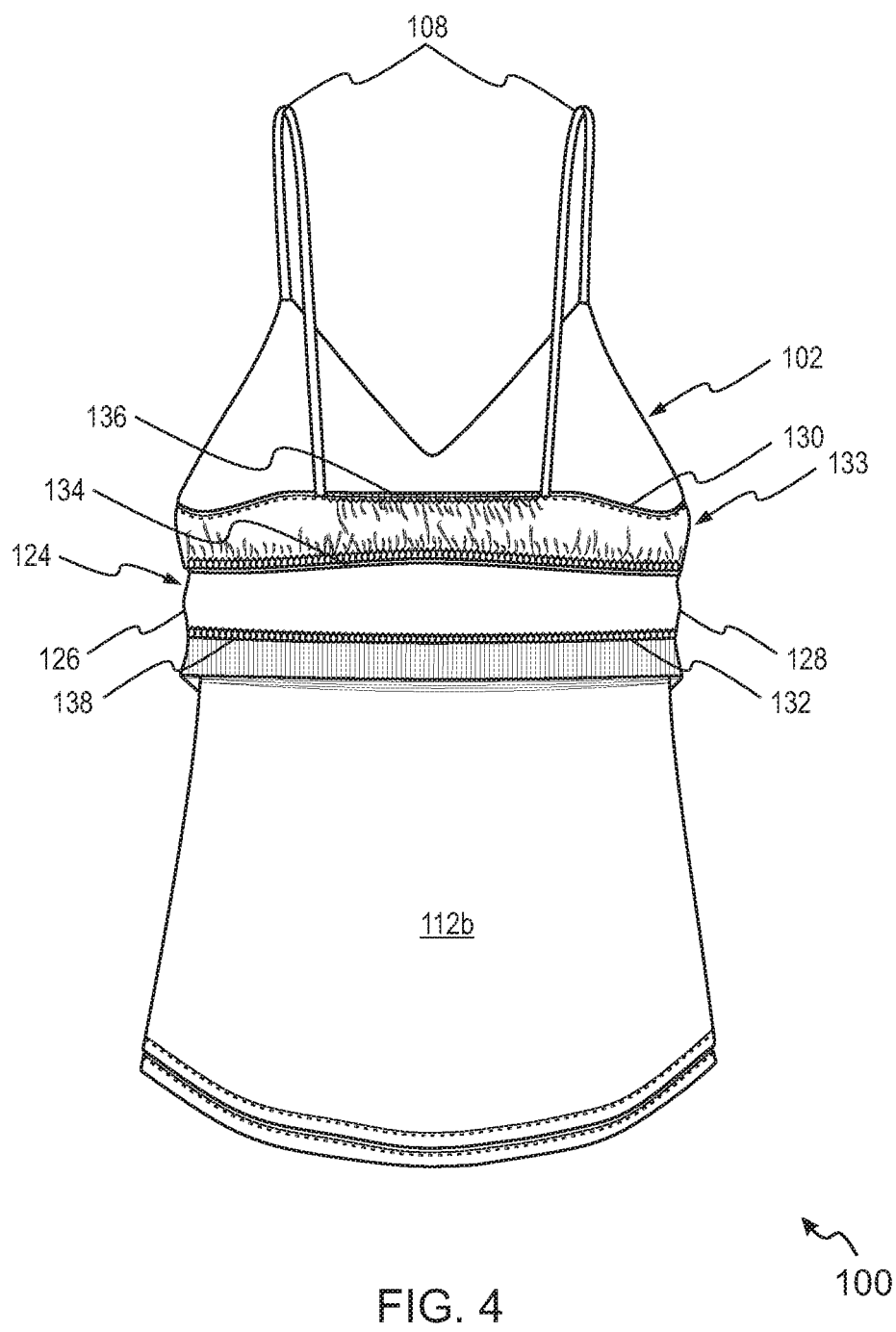
FIG. 4 is an interior rear view article of the garment with built-in bra of FIG. 1, according to an embodiment of the present disclosure.

As shown in FIGS. 1 and 3, the front fabric portion 104 includes an outer surface 110a and an inner surface 110b opposite to the outer surface 110a; such that when the garment 100 is worn by the wearer, the inner surface 110b is in contact with the chest of the wearer, while the outer surface 110a is on the opposite side towards the front as to be seen by a viewer in front of and facing the wearer. Similarly, as shown in FIGS. 2 and 4, the back fabric portion 106 includes an outer surface 112a and an inner surface 112b opposite to the outer surface 112a; such that when the garment 100 is worn by the wearer, the inner surface 112b is in contact with the back of the wearer.

As illustrated more clearly in FIG. 3, the garment 100 provides a built-in bra. Specifically, the garment 100 includes a pair of bra cups 114a and 114b. Further, as illustrated in FIG. 3, the garment 100 includes a pair of side panels 116a and 116b. Each bra cup of the pair of bra cups 114a and 114b has a curvilinear profile. In the present embodiment, the bra cups 114a and 114b are shown to have circular profiles. In other embodiments, the bra cups 114a and 114b may have elliptical, oval or any other profiles adapted to substantially cover the chest portion. Further, the pair of side panels 116a and 116b, like the first fabric layer 102, may be made of a non-elastic or slightly elastic material, such as the material implemented for the front fabric portion 104 and the back fabric portion 106. The pair of side panels 116a and 116b may be of any shape.

The bra cups 114a and 114b are disposed on the inner surface 110b of the front fabric portion 104. The bra cups 114a and 114b are positioned on the first fabric layer 102, such that the bra cups 114a and 114b are at least substantially concealed behind the first fabric layer 102, when the garment 100 is worn. Generally, the bra cups 114a and 114b are made of soft bra cups with no underwire and the like.

As illustrated in FIG. 3, the pair of bra cups 114a and 114b may be generally sectioned along their peripheries to include first peripheral portions 118a and 118b, second peripheral portions 120a and 120b, and third peripheral portions 122a and 122b. The first peripheral portions 118a and 118b of the pair of bra cups 114a and 114b may be substantially diametrically opposite to the third peripheral portions 122a and 122b. Further, the third peripheral portion 122a of the bra cup 114a is proximate to the third peripheral portion 122b of the bra cup 114b. In the present embodiment, the first peripheral portions 118a and 118b of the pair of bra cups 114a and 114b, may be connected to the pair of side panels 116a and 116b respectively. In alternative embodiments, the first peripheral portions 118a and 118b and the top portions of the pair of bra cups 114a and 114b are connected to the first fabric layer 102 through two side panels 116a and 116b. Further, the pair of side panels 116a and 116b may be sewn onto the inner surface 110b of the front fabric portion 104 along with one or both of the armhole and the neckline of the garment 100. In alternative embodiments, the pair of side panels 116a and 116b may be connected to the inner surface 110b of the front fabric portion 104 by any other joining means.

According to an embodiment of the present disclosure, the garment 100 further includes a second fabric layer 124. The second fabric layer 124 has a front fabric portion and a back fabric portion. The front fabric portion of the second fabric layer 124 may be made of elastic or non-elastic material. The back fabric portion of the second fabric layer 124 may be made of elastic material. The elasticity of the second fabric layer 124 is higher than the elasticity of the first fabric layer 102. The front fabric portion and the back fabric portion of the second fabric layer 124 may have identical or different elasticity. In an embodiment, the second fabric layer 124 is made of a stretchable fabric material. Hereinafter, the second fabric layer 124 is sometimes interchangeably referred to as "stretchable fabric layer." As illustrated in FIG. 4, the back fabric portion of the second fabric layer 124 extends horizontally along the back of the wearer, when the garment 100 is worn. The back fabric portion of the second fabric layer 124 includes a first end 126, a second end 128, a top edge 130 and a bottom edge 132. In the present embodiment, as illustrated in FIG. 3, the front fabric portion of the second fabric layer 124 is connected to the second peripheral portions 120a and 120b of the pair of bra cups 114a and 114b from respective two ends 128, 126. In particular, as illustrated in FIG. 3, the second end 128 of the second fabric layer 124 is connected to the second peripheral portion 120a of the bra cup 114a, and the first end 126 is connected to the second peripheral portion 120b of the bra cup 114b, respectively. In an alternative embodiment, the second fabric layer 124 is connected to the second peripheral portions 120a and 120b and the third peripheral portions 122a and 122b of the pair of bra cups 114a and 114b from respective two ends 128, 126. In particular, the second end 128 of the second fabric layer 124 is connected to the second peripheral portion 120a and third peripheral portion 122a of the bra cup 114a, and the first end 126 is connected to the second peripheral portion 120b and third peripheral portion 122b of the bra cup 114b, respectively. In alternative embodiments, the front fabric portion and the back fabric portion of the second fabric layer 124 can be a continuous fabric structure.

In an embodiment, the garment 100 further includes one or more flexible bands 133. The one or more flexible bands 133, are positioned between the back fabric portion of the second fabric layer 124 and the inner surface 112b of the back fabric portion 106. Further, the one or more flexible bands 133 are sewn to the second fabric layer 124 and the inner surface 112b of the back fabric portion 106, thereby connecting the first fabric layer 102 and the second fabric layer 124 in the garment 100. In an embodiment, the garment 100 includes two flexible bands, a first flexible band 134 and a second flexible band 136. Each of the first flexible band 134 and the second flexible band 136 is made of an elastic material. In the present examples, each of the first flexible band 134 and the second flexible band 136 may be made of the same material having identical elastic properties.

In an embodiment, the first flexible band 134 extends proximally to the bottom edge 132 of the back fabric portion of the second fabric layer 124, while the second flexible band 136 extends along or proximally to the top edge 130 of the back fabric portion of the second fabric layer 124. That is, the first flexible band 134 is positioned and extends below the second flexible band 136. The distance between the first flexible band 134 and the second flexible band 136 can be of any length. Generally, the distance between the first flexible band 134 and the second flexible band 136 is of a few inches. In one embodiment, the distance between the first flexible band 134 and the second flexible band 136 is about one inch. In one embodiment, as shown in FIG. 4, the extension of the second flexible band 136 is limited between the pair of the shoulder straps 108, as connected to the back fabric portion 106. In alternative embodiments of the present disclosure, the extension of the second flexible band 136 does not have any limitations. In alternative embodiments, the one or more flexible bands 133 may include a single flexible band, i.e. the first flexible band 134 only, or more than two flexible bands (as discussed later) without any limitations. Further, the garment 100 also includes a third flexible band 138 extending along the bottom edge 132 of the second fabric layer 124.

As illustrated in FIG. 4, in the garment 100 of the present disclosure, the first flexible band 134 extends along the back fabric portion 106 around the back of the wearer, connecting the upper part of the back fabric portion of the second fabric layer 124 (i.e. the area between the first flexible band 134 and the second flexible band 136 in FIG. 4) and bottom part of the back fabric portion of the second fabric layer 124 (i.e. the area between the first flexible band 134 and the third flexible band 138 in FIG. 4). The upper part of the back fabric portion of the second fabric layer 124 may be made of the same or substantially same material as the first fabric layer 102; and the bottom part of the back fabric portion of the second fabric layer 124 is made from elastic material. The said upper part of the back fabric portion of the second fabric layer 124 is connected or sewn to the first fabric layer 102 along the top edge 130. In some embodiments, the first flexible band 134 extends along the back fabric portion 106 to be connected to the second peripheral portions 120a and 120b of the pair of bra cups 114a and 114b. In other embodiments, the first flexible band 134, in addition to being connected to the first peripheral portions 118a and 118b of the pair of bra cups 114a and 114b, may also be connected to the pair of side panels 116a and 116b of the front fabric portion 104.

In one embodiment of the present disclosure, as shown in FIG. 3, the garment 100 further includes a stabilizing panel 140. The stabilizing panel 140 is disposed between the bra cups 114a and 114b. Specifically, the stabilizing panel 140 is connected with the third peripheral portions 122a and 122b of the bra cups 114a and 114b. In the present examples, the stabilizing panel 140 has a substantially triangular shape. The stabilizing panel 140 is generally made of a non-elastic or substantially non-elastic material, and thereby the stabilizing panel 140 may be adapted to resist relative movement between the pair of the bra cups 114a and 114b in the garment 100.

The garment 100 is one piece, which is easier for the wearer to put on and take off. During the utilizing of the garment 100, the wearer may insert the arms and head through the openings for receiving arms and head, as defined between the top peripheral surface of each of the front fabric portion 104, the back fabric portion 106, and the pair of shoulder straps 108. The garment 100 is accordingly rested on the neck or shoulders of the wearer. The front fabric portion 104 substantially covers the chest of the wearer, while the back fabric portion 106 substantially covers the back of the wearer. The front fabric portion 104 and the back fabric portion 106, provide a loose-fitting look from the outside, and therefore may be aesthetically appealing. The substantially non-elastic material of the front fabric portion 104 and the back fabric portion 106 of the first fabric layer 102 ensures that the outer shell of the garment 100 does not stretch under application of predetermined force and as a result does not provide a flattered appearance.

In the garment 100, since the second fabric layer 124 is made of stretchable material and is connected to one or more flexible bands, the interior bra structure, which includes the pair of bra cups 114a and 114b, expands or retracts, as required to conform to the breast of the wearer. The second fabric layer 124 allows for elastic movement of the first flexible band 134, the second flexible band 136, and the third flexible band 138. Further, since the elasticity of the first fabric layer 102 is lower than the elasticity of the second fabric layer 124, the first fabric layer 102 remains unaffected despite application of the force by the first flexible band 134, the second flexible band 136, or the third flexible band 138, while the interior bra structure, which includes the bra cups 114a and 114b, may move, expand or contract in order to be body-hugging and supportive. Accordingly, the present disclosure eliminates any need for underwire, fasteners, padding, snaps, clasps, or pins for securing the bra cups 114a and 114b against the breasts of the wearer. Therefore, the present disclosure is more comfortable than existing garments that require the use of hardware, which may pinch the wearer.

When the garment 100 is worn, the elastic nature of the one or more flexible bands 133 ensures that the built-in bra structure, including the pair of bra cups 114a and 114b, is secured in place against the breast of the wearer. When the garment 100 is worn, the elasticity of the first flexible band 134 and the second flexible band 136, extending around the back of the wearer, applies force on the bra cups 114a and 114b to snugly hold them against the breasts of the wearer. Thus, upon wearing the garment 100, the pair of bra cups 114a and 114b covers the breast of the wearer in a body-hugging manner. Further, such connection of the first flexible band 134, the second flexible band 136, and the third flexible band 138 also ensures that the weight of the wearer's breasts, when the garment 100 is worn, is distributed between the pair of shoulder straps 108 and the third flexible band 138. Therefore, the garment 100 of the present disclosure with the first flexible band 134, the second flexible band 136, the third flexible band 138, along with the second fabric layer 124, can firmly support the breasts of the wearer and reliably support the bra cups 114a and 114b on the body of the wearer without the need for underwire, fasteners, padding, snaps, clasps, or pins. As a result, the garment 100 avoids the risk of bra slippage and the inconvenience caused by wearing a separate strapless bra or adhesive bra.

The embodiments illustrated and described herein as well as embodiments not specifically described herein but within the scope of aspects of the invention constitute exemplary garment.

The benefits and advantages described above may relate to one embodiment or may relate to several embodiments. The embodiments are not limited to those that solve any or all of the stated problems or those that have any or all of the stated benefits and advantages.

The above description is given by way of example only and various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

What is claimed is:

1. A garment with built-in bra, the garment comprising:
   a. a first fabric layer including:
      i. a front fabric portion for at least partially covering a chest of a wearer, the front fabric portion having an outer surface and an inner surface opposite to the outer surface thereof;
      ii. a back fabric portion for at least partially covering a back of the wearer, the back fabric portion having an outer surface and an inner surface opposite to the outer surface thereof;
      iii. a pair of bra cups disposed on the inner surface of the front fabric portion, each bra cup of the pair of bra cups having a first peripheral portion, a second peripheral portion and a third peripheral portion; and
      iv. a pair of side panels sewn to the inner surface of the front fabric portion and connected to each bra cup of the pair of bra cups at respective first peripheral portions;
   b. a second fabric layer including:
      i. a back fabric portion, extending along the inner surface of the back fabric portion of the first fabric layer and having a first end and a second end; and
      ii. a front fabric portion, extending from the respective two ends of the back fabric portion of the second fabric layer and connecting to the pair of bra cups at one or more of the second peripheral portions and the third peripheral portions; and
   c. a plurality of flexible bands unconnected with each other, with each flexible band extending between and sewn to the back fabric portion of the second fabric layer and the inner surface of the back fabric portion of the first fabric layer to connect the first fabric layer and the second fabric layer therein.

2. The garment as claimed in claim 1, wherein the plurality of flexible bands comprises a first flexible band and a second flexible band, the second flexible band extending along or proximally to a top edge of the back fabric portion of the second fabric layer and the first flexible band extending below the second flexible band.

3. The garment as claimed in claim 2, wherein the plurality of flexible bands comprise a third flexible band extending along or proximally to a bottom edge of the second fabric layer.

4. The garment as claimed in claim 1, wherein a pair of shoulder straps is connected at least to the front fabric portion of the first fabric layer.

5. The garment as claimed in claim 1, wherein the first peripheral portion and the third peripheral portion of each bra cup of the pair of bra cups are located substantially diametrically opposite to each other, and the second peripheral portion is located between the first peripheral portion and the third peripheral portion in each bra cup of the pair of bra cups.

6. The garment as claimed in claim 1, wherein each of the first and second fabric layers has a respective elasticity, and wherein the elasticity of the first fabric layer is lower than the elasticity of the second fabric layer.

7. A garment with built-in bra, the garment comprising:
   a. a first fabric layer including:
      i. a front fabric portion for at least partially covering a chest of a wearer, the front fabric portion having an outer surface and an inner surface opposite to the outer surface thereof;
      ii. a back fabric portion for at least partially covering a back of the wearer, the back fabric portion having an outer surface and an inner surface opposite to the outer surface thereof;
      iii. a pair of bra cups disposed on the inner surface of the front fabric portion, each bra cup of the pair of bra cups having a first peripheral portion, a second peripheral portion and a third peripheral portion; and
      iv. a pair of side panels sewn to the inner surface of the front fabric portion and connected to each bra cup of the pair of bra cups at respective first peripheral portions;
   b. a second fabric layer including:
      i. a back fabric portion, extending along the inner surface of the back fabric portion of the first fabric layer and having a first end and a second end; and
      ii. a front fabric portion, extending from the respective two ends of the back fabric portion of the second fabric layer and connecting to the pair of bra cups at one or more of the second peripheral portions and the third peripheral portions; and
   c. a first flexible band extending between and sewn to the back fabric portion of the second fabric layer and the inner surface of the back fabric portion of the first fabric layer to connect the first fabric layer and the second fabric layer therein.

8. The garment as claimed in claim 7, further comprising a second flexible band unconnected to the first flexible band, with the second flexible band extending along or proximally to a top edge of the back fabric portion of the second fabric layer and the first flexible band extending below the second flexible band.

9. The garment as claimed in claim 7, further comprising a second flexible band unconnected to the first flexible band, with the second flexible band extending along or proximally to a bottom edge of the second fabric layer.

10. The garment as claimed in claim 7, wherein a pair of shoulder straps is connected at least to the front fabric portion of the first fabric layer.

11. The garment as claimed in claim 7, wherein the first peripheral portion and the third peripheral portion of each bra cup of the pair of bra cups are located substantially diametrically opposite to each other, and the second peripheral portion is located between the first peripheral portion and the third peripheral portion in each bra cup of the pair of bra cups.

12. The garment as claimed in claim 7, wherein each of the first and second fabric layers has a respective elasticity, and wherein the elasticity of the first fabric layer is lower than the elasticity of the second fabric layer.

* * * * *